United States Patent [19]

Takabayasi et al.

[11] Patent Number: 5,101,599
[45] Date of Patent: Apr. 7, 1992

[54] ULTRASONIC MACHINE HAVING AMPLITUDE CONTROL UNIT

[75] Inventors: Hideki Takabayasi, Yokahama; Teruhiko Moriyama, Nagoya, both of Japan

[73] Assignee: Brother Kogyo Kabushiki Kaisha, Japan

[21] Appl. No.: 709,283

[22] Filed: Jun. 3, 1991

[30] Foreign Application Priority Data

Jul. 3, 1990 [JP] Japan ............................ 2-177072

[51] Int. Cl.⁵ .................................... B24B 49/16
[52] U.S. Cl. ................................ 51/59 SS; 83/701; 173/11
[58] Field of Search ............ 51/59 SS; 83/701, 861, 83/879; 173/4, 11

[56] References Cited

U.S. PATENT DOCUMENTS

| | | | |
|---|---|---|---|
| 2,504,831 | 4/1950 | Griss | 51/59 SS |
| 2,942,383 | 6/1960 | Brown et al. | 51/59 SS |
| 3,668,486 | 6/1972 | Silver | 310/316 |
| 4,934,103 | 6/1990 | Campergue et al. | 51/59 SS |

FOREIGN PATENT DOCUMENTS

| | | |
|---|---|---|
| 9009870 | 9/1990 | European Pat. Off. . |
| 58-81469 | 5/1983 | Japan . |
| 61-241048 | 10/1986 | Japan . |
| 62-162451 | 7/1987 | Japan . |
| 0536850 | 11/1976 | U.S.S.R. . |

Primary Examiner—Bruce M. Kisliuk
Assistant Examiner—Bryan Reichenbach
Attorney, Agent, or Firm—Oliff & Berridge

[57] ABSTRACT

An amplitude control unit for an ultrasonic machine comprises a load detector for detecting the load applied to the tip of a tool during ultrasonic machining on the work, a load/amplitude conversion circuit for converting the load output detected by the load detector into an amplitude conversion value appropriate for the load at the tip of the tool, an amplitude addition circuit for receiving the amplitude conversion value generated by the load/amplitude conversion circuit and for adding it to a predetermined amplitude value at no load. The vibration of the piezoelectric transducer is changed to correspond to the load applied to the work by sending the new amplitude value generated by the amplitude addition circuit to the high frequency oscillator.

16 Claims, 3 Drawing Sheets

ULTRASONIC MACHINE HAVING AMPLITUDE CONTROL UNIT

BACKGROUND OF THE INVENTION

The present invention relates to an ultrasonic machine having an amplitude control unit which controls at an amplitude value of an ultrasonic vibration unit provided in the ultrasonic machine.

Industrial applications of ultrasonic waves cover a wide range of fields. For instance, ultrasonic abrasive grain machining and ultrasonic cutting are quite well-known. Abrasive grain machining for boring, cutting, and polishing hard, brittle materials such as glass and silicon, includes the steps of ultrasonically elastic-vibrating a tool, pressing the ultrasonically-vibrated tool onto the work via a machining liquid containing abrasive grains, and gradually machining the work to the tool shape. In cutting, on the other hand, a tool such as a turning tool is given vibration in the cutting direction, thus performing predetermined machining on the work.

As illustrated in FIG. 3, the basic composition of such an ultrasonic machine utilized for carrying out the above machining includes a mechanical vibration unit, a work table 20 upon which a work 18 is placed, a feed unit 22 for feeding the work table 20 in X and Y directions, and an abrasive grain supply unit 24 provided if necessary. The mechanical vibration unit comprises a high frequency oscillator 58, a piezoelectric transducer 12 as an ultrasonic vibrator for converting high-frequency electric energy generated by the high frequency oscillator 58 into mechanical vibration energy, and a solid horn 16 for transmitting the vibration energy to a tool 14. The high-frequency oscillation circuit provided in this type of prior-art ultrasonic machine for supplying high-frequency electric energy to the piezoelectric transducer generally adopts a constant amplitude method in which frequency change is automatically followed up in feedback control. The present invention is made to overcome problems which remain unsolved by such prior-art ultrasonic machines. The conventional constant amplitude method will be explained below with reference to FIG. 2.

In FIG. 2, 26 generally indicates an ultrasonic vibration unit comprising a piezoelectric transducer 12 and a tool 14 mounted thereon via a horn 16. The piezoelectric transducer 12 is provided with a vibration detector 28 comprising an electrostrictive element. A high frequency voltage generated by a voltage controlled oscillator 30 which is provided in a high frequency oscillator 58 is sent via a waveform shaping circuit 32 and a variable amplitude amplifier 34 to a power amplification circuit 36 where the high frequency voltage is electrically amplified. The amplified high frequency voltage is then input to the piezoelectric transducer 12, which vibrates the ultrasonic vibration unit at a predetermined amplitude. At this time, the vibration detector 28 receives a sine wave voltage proportional to the vibrational speed of the piezoelectric transducer 12. Part of the received sine wave voltage output is fed back to a detection circuit 38.

The detection circuit 38 rectifies the feedback voltage, from the vibration detector 28 compares the feedback voltage with a reference voltage at an input line 40, and feeds back the voltage difference between the feedback voltage and the reference voltage at the input line 40 to the variable amplitude amplifier 34 via an amplifier 42 and a time constant circuit 44. In this way, constant amplitude control of the piezoelectric transducer 12 corresponding to the reference voltage is performed at all times regardless of the load applied to the tip of the tool 14 during ultrasonic machining.

Furthermore, after being partly fed backed to a zero point detection circuit 46 which is provided in the high frequency oscillator 58, the sine wave voltage from the vibration detector 28 is sent to a phase comparison circuit 50 where it is compared with the high frequency voltage which has been phase-controlled by a phase control circuit 48. Direct voltage corresponding to the phase difference is positively fed back to the voltage controlled oscillator 30 via a DC amplifier 52, thus matching the oscillation frequency with the resonance frequency of the piezoelectric transducer 12.

Depending on the type of ultrasonic machining, the tool 14 may have to be extremely small in size in comparison with the piezoelectric transducer 12 and the horn 16. In such a case, the greater the load applied to the tip of the tool 14 becomes, the smaller the amplitude of the tool in contact with the work becomes even though the amplitude of the high frequency supplied to the piezoelectric transducer 12 is controlled to be constant. This results in deterioration of machining efficiency, and of the chip disposal rate; and, machining failure in the worst case.

Because the tool 14 tends to slip on the work in the initial stage of ultrasonic machining, the high frequency amplitude supplied to the piezoelectric transducer 12 needs to be small or the feed speed of the tool 14 needs to be slow. If machining is started with a large amplitude, various problems will arise including a shortened life of the tool 14, unnecessary exothermic effects, and noise as well as the slippage of the tool 14 mentioned above.

In addition, deeper cutting by the tool 14 necessitates a larger amplitude of the tool 14 so as to facilitate chip disposal. Also, fine adjustment of amplitude may be necessary to suit sharpness of the tool 14. The operator of ultrasonic machines has depended on his/her skill and experience to make these adjustments by changing the reference voltage at the input line 40 so that the most appropriate amplitude is obtained for different types of machining.

SUMMARY OF THE PRESENT INVENTION

The object of the present invention made to overcome the above-identified problems is to provide an amplitude control unit for an ultrasonic machine in which the amplitude of the piezoelectric transducer is changed to correspond to changes of the load applied to the tip of a tool and a work so that the operator is relieved of the difficult and tedious task of setting a amplitude appropriate to various conditions for different types of machining.

Other objects and benefits of the invention will become apparent from the detailed description which follows hereinafter when taken in conjunction with the drawing figures which accompany it.

The above and other related objects of the present invention are realized by an amplitude control unit for an ultrasonic machine including a high frequency oscillator for generating oscillation output, a piezoelectric transducer for vibrating at a predetermined amplitude upon receiving the oscillation output from the high frequency oscillator, and a tool connected to the piezoelectric transducer via a horn for ultrasonically machining a work. The amplitude control unit comprises: a load detection means for detecting the load applied to the tip of the tool during ultrasonic machining on the work; a load/amplitude conversion circuit for converting the load output detected by the load detection means into an amplitude conversion value appropriate for the load at the tip of the tool; and an amplitude addition circuit for receiving the amplitude conversion value generated by the load/amplitude conversion circuit and adding thereof to a predetermined amplitude value at no load, in which the vibration of the piezoelectric transducer is changed to correspond to the load applied to the work by sending the new amplitude value generated by the amplitude addition circuit to the high frequency oscillator.

In the operation of the amplitude control unit for an ultrasonic machine of the present invention, when the load detection means such as a load scale detects the load (machining resistance) applied to the tip of the tool, the load/amplitude conversion circuit converts the detected load into the amplitude conversion value appropriate for the load applied to the tip of the tool. Then, the amplitude conversion value generated by the load/amplitude conversion circuit is sent to the amplitude addition circuit where the amplitude conversion value is added to the predetermined amplitude value at no load, which changes the predetermined amplitude of the high frequency oscillator.

DESCRIPTION OF THE PREFERRED EMBODIMENT

Referring to the attached drawings, a preferred embodiment of the present invention will be hereinafter explained.

Figure 1:
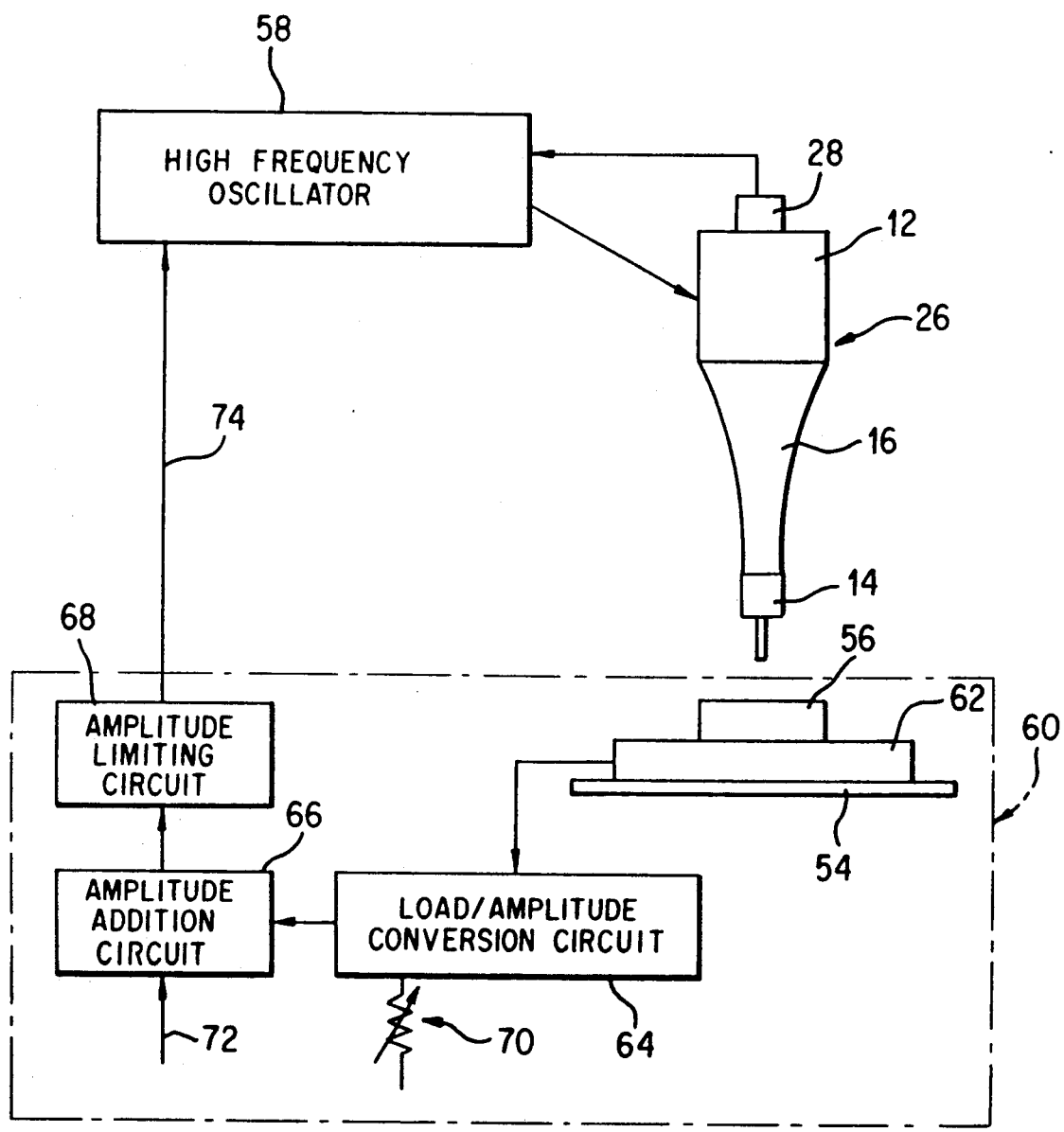
FIG. 1 is a block diagram of the amplitude control unit embodying the present invention.
Figure 2:
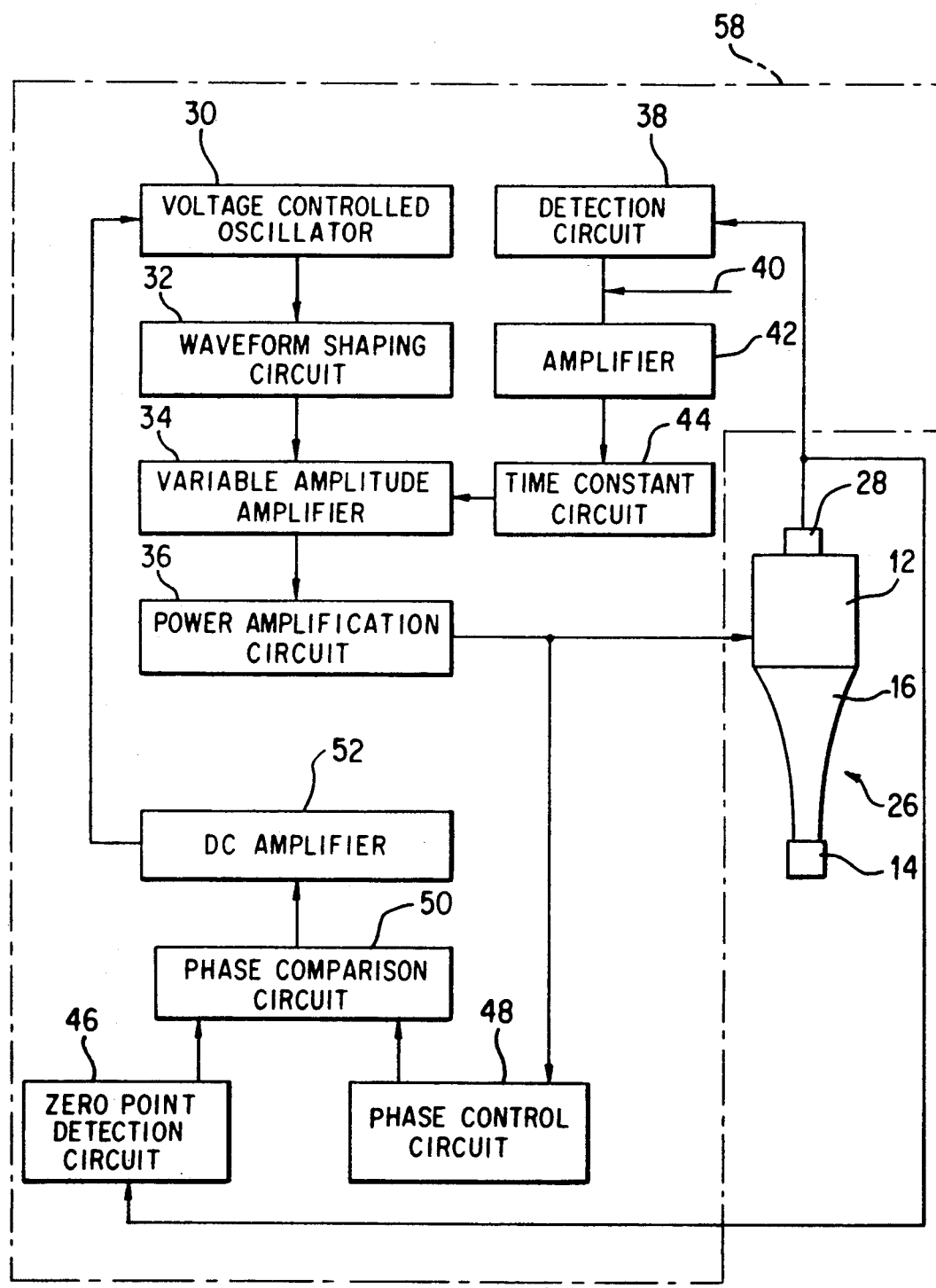
FIG. 2 is a circuit block diagram of a prior-art approach to amplitude control of an ultrasonic machine.
Figure 3:
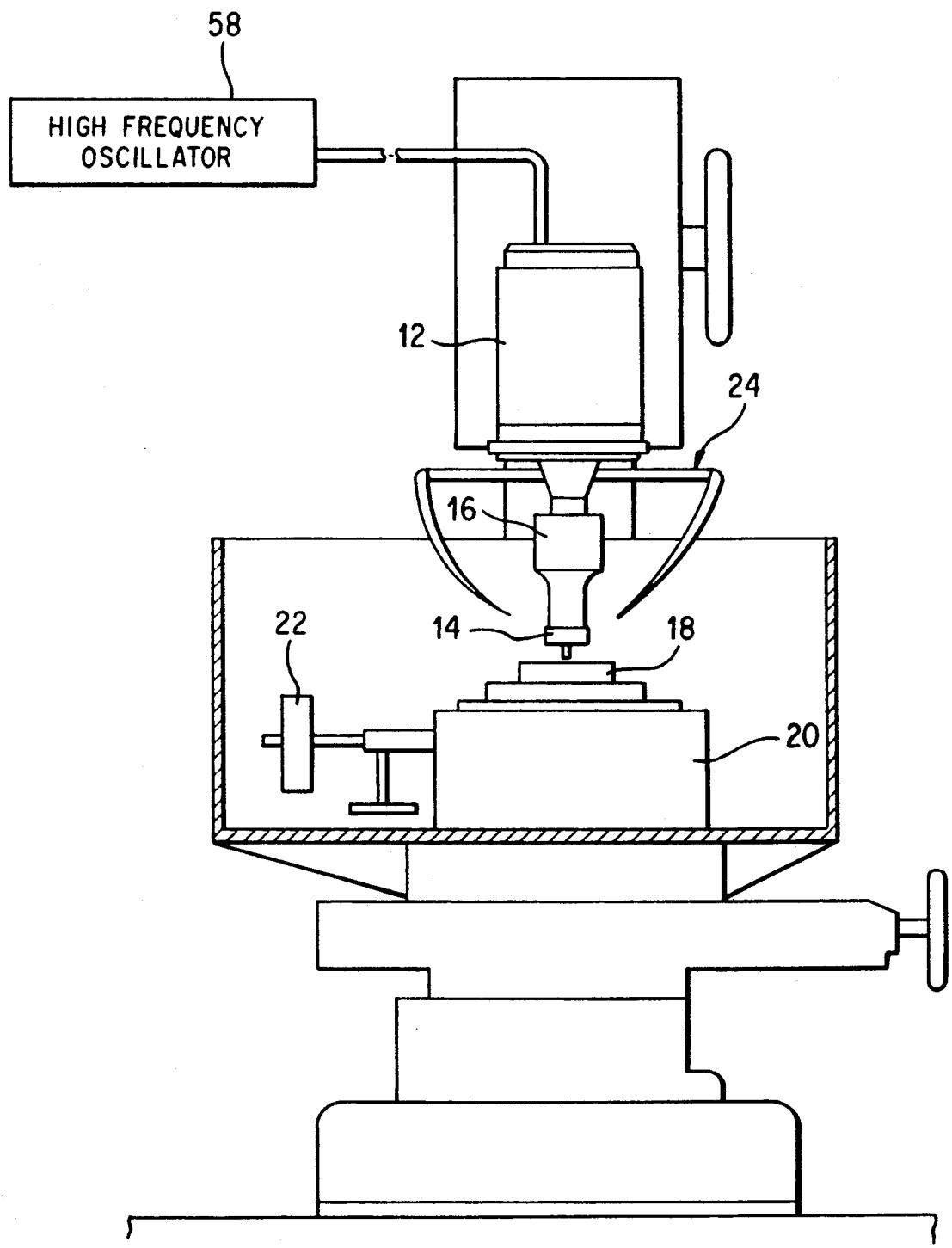
FIG. 3 is a schematic illustration of a typical prior-art ultrasonic machine.

FIG. 1 shows a functional block diagram of an amplitude control u it according to the present invention controlling an ultrasonic vibration system 26 substantially identical to the one shown in FIG. 2. The ultrasonic vibration system 26 is rotatably and vertically movably installed on the main shaft (not shown) of an ultrasonic machine and performs ultrasonic machining such as boring on a work 56 placed on a work table 54 of the ultrasonic machine High frequency voltage for excitation is supplied via a high frequency oscillator 58 to the piezoelectric transducer 12 of the ultrasonic vibration system 26 of the ultrasonic machine. The high frequency oscillator 58 is substantially identical to the one shown in FIG. 3. Indicated as 60 in FIG. 1 is the amplitude control unit embodying the present invention. Provided on the work table 54 is a load detector 62 functioning as a transducer for converting a load applied to the work 56 fixed thereon into an electric signal during ultrasonic machining. A load scale such as a load cell, which transforms an applied mechanical load to an electrical signal, is preferably used for the load detector 62. In this way, the load on the work 56 detected by the load detector 62 equals the load applied to the tip of the tool 14. Although the load scale 62 is installed on the work table 54 in this embodiment, the load detection means may be installed in the ultrasonic vibration system 26, if desired.

In FIG. 1, numeral 64 indicates a load/amplitude conversion circuit for converting the electrical signal from the load detector means 62 reflecting the load applied to the tip of the tool 14 to an amplitude conversion value. Numeral 66, on the other hand, denotes an amplitude addition circuit for adding the amplitude conversion value to the amplitude value with no load applied to the tool tip. The amplitude addition circuit 66, connected to the high frequency oscillator 58 via an amplitude limiting circuit 68, sets an upper limit of the amplitude value as explained below. Also, the load/amplitude conversion circuit 64 is connected with a gain control unit 70.

After the work 56 is fixed on the work table 54 via the load scale 62, the ultrasonic machine is switched on to prepare for machining. At this time, the amplitude addition circuit 66 receives a predetermined amplitude 72 at no load so that the ultrasonic vibration system 26 generates small ultrasonic vibration. Upon contacting the work 56 to start ultrasonic machining, the tip of the tool 14 receives a load, which is subject to change due to the machining conditions. Thus, the load that the tip of the tool 14 receives is detected as the load applied to the work 56 by the load scale 62.

The detected output from the load scale 62 is sent to the load/amplitude conversion circuit 64, in which the detected load value is converted into an amplitude conversion value appropriate for the load applied to the tip of the tool 14. Then, the amplitude conversion value is sent to the amplitude addition circuit 66, in which the amplitude conversion value is added to the above predetermined amplitude 72 at no load. The amplitude addition circuit 66 sends the added amplitude value as an amplitude addition value 74 to the high frequency oscillator 58 to control the output thereof. Subsequently, the high frequency oscillator 58 supplies a high frequency voltage to the ultrasonic transducer 12 based on the amplitude addition value output on line 74 and, accordingly, the vibration generated by the ultrasonic vibration system 26 changes. Because the amplitude addition value at 74 changes to correspond to the load applied to the tip of the tool 14, the amplitude of the ultrasonic vibration system 26 automatically increases in proportion to load increases and decreases in proportion to load decreases during machining. The amplitude addition value eventually reaches equilibrium when the machining resistance of the work 56 settles at an appropriate level after initially fluctuating.

As can be seen from FIG. 1, the amplitude addition value from the amplitude addition circuit 66 is sent to the high frequency oscillator 58 preferably via an amplitude limiting circuit 68, which is provided to prevent too high an amplitude addition value from going directly to the high frequency oscillator 58. This could happen, for example, due to the machining conditions such as the material of the tool 14 or if too much gain is set for the load/amplitude conversion circuit 64.

Although the load/amplitude conversion circuit 64 automatically generates an amplitude conversion value corresponding to the tip of the tool 14, the gain can be adjusted to suit the diameter or the rigidity of the tool 14 by a gain adjuster 70. For instance, if the rigidity of the tool 14 is such as to cause an insufficient amplitude of the tip of the tool 14, it is recommended that the gain be set at a larger value.

As should be clear from the above explanation, according to the amplitude control system for an ultrasonic machine of the present invention, the ultrasonic vibration system 26 automatically changes its amplitude to obtain the most appropriate machining resistance even in the case of an increased load applied to the tip of the tool 14 due to a reduction of cutting ability of the tool or insufficient disposal of chips caused by deep machining. Meanwhile, if a small amplitude is desired to facilitate initial machining, the amplitude can be decreased automatically by simply slowing the feed speed and thereby lessening the load applied to the tip of the tool 14.

In the above-described embodiment, the load applied to the tip of the tool 14 is detected by the load scale 62 provided between the work table 54 and the work 56., however, a load detection means may be installed in association with the tool 14 of the ultrasonic vibration system 26 such that the load applied to the tool 14 is detected directly. Moreover, fluctuation of the drive frequency of the high frequency oscillator may be detected based on fluctuation of the load applied to the tip of the tool. This way, the load applied to the tip of the tool 14 can be detected indirectly to carry out the above amplitude control.

The amplitude control unit for an ultrasonic machine changes according to the load change applied to the tip of the tool, thereby adjusting the amplitude of the ultrasonic transducer. Even if a small-diameter tool having a low rigidity is used for ultrasonic machining, the load applied to the tip of the tool does not reduce the amplitude to provide stable and reliable performance. In addition, even if the ultrasonic machine bores deep into the work to otherwise cause insufficient chip disposal and increase the machining resistance, stable performance is secured because the ultrasonic vibration system automatically steps up its vibration to facilitate chip disposability. Likewise, stable performance is obtained even if the tool becomes dull. Furthermore, unnecessary energy output, and excessive exothermic effects and noise can also be avoided.

In the initial stage of machining, the tool tends to slip on the work due to ultrasonic vibration. In such a case, the most appropriate amplitude corresponding to the load at the tool tip is automatically obtained if the feed speed is slowed down. This invention provides the great advantages that amplitude is automatically set so as to relieve the operator of the task of manually setting an appropriate amplitude value relying upon his/her skill and experience. Thus, ultrasonic machining can be carried out more easily.

What is claimed is:

1. An ultrasonic machine comprising:
   an ultrasonic vibrator;
   a tool connected to said ultrasonic vibrator for machining a work;
   driving means for driving said ultrasonic vibrator;
   detecting means for detecting a load applied to said tool; and
   control means for controlling said driving means based on the load detected by said detecting means such that said ultrasonic vibrator vibrates said tool at an amplitude in response to the load.

2. The ultrasonic machine according to claim 1, wherein said driving means includes a high frequency oscillator for generating an oscillation output in accordance with an amplitude instruction signal input thereto.

3. The ultrasonic machine according to claim 2, wherein said control means includes producing means for producing the amplitude instruction signal based on the load detected by said detecting means and supplying means for supplying the amplitude instruction signal to said high frequency oscillator.

4. The ultrasonic machine according to claim 3, wherein said control means includes preventing means for preventing said supplying means from supplying the amplitude instruction signal which instructs an amplitude value more than a predetermined amplitude value.

5. The ultrasonic machine according to claim 1, further comprising:
   a work table for mounting the work thereon, wherein said detecting means is disposed on said work table and mounts the work thereon.

6. An automatic amplitude control apparatus for an ultrasonic machine including a high frequency oscillator for generating an oscillation output in accordance with a signal input thereto, an ultrasonic vibrator for vibrating at an amplitude upon receiving the oscillation output from said high frequency oscillator, a tool connected to said ultrasonic vibrator for ultrasonically machining a work, and a work table for mounting the work thereon, comprising:
   load detection means for detecting a load applied to said tool during ultrasonic machining and for outputting a load detection signal reflecting the load; and
   adjusting means for adjusting the signal input, of said high frequency oscillator to reflect a change of the load detection signal, and for inputting an adjusted signal to said high frequency oscillator to control the oscillation output thereof, whereby the amplitude of vibration of said ultrasonic vibrator is automatically changed based on a change of the load on said tool.

7. The automatic amplitude control apparatus for an ultrasonic machine according to claim 4, wherein said adjusting means includes:
   load/amplitude conversion circuit means for converting the load detection signal into an amplitude conversion value appropriate for the load, and
   amplitude addition circuit means for receiving the amplitude conversion value, for generating a new amplitude value by adding the amplitude conversion value to a predetermined amplitude value which is used when there is no load on said tool, and for outputting the new amplitude value to said high frequency oscillator.

8. The automatic amplitude control apparatus for an ultrasonic machine according to claim 7, wherein said adjusting means further includes gain adjustment means for adjusting a gain value of said load/amplitude conversion circuit means, whereby a gain of conversion by said load/amplitude conversion circuit means can be adjusted in accordance with a type of the tool.

9. The automatic amplitude control apparatus for an ultrasonic machine according to claim 7, wherein said adjusting means further includes limit means for receiving the new amplitude value, and for outputting no more than a predetermined upper limit value for the new amplitude value to said high frequency oscillator.

10. The automatic amplitude control apparatus for an ultrasonic machine of claim 7, wherein said amplitude addition circuit means includes means for inputting the predetermined amplitude value at no load.

11. The automatic amplitude control apparatus for an ultrasonic machine according to claim 6, wherein said load detection means is provided on said work table and mounts the work thereon.

12. An ultrasonic machine comprising:
- a high frequency oscillator for generating an oscillation output in accordance with an amplitude value input thereto;
- an ultrasonic vibrator for vibrating at an amplitude upon receiving the oscillation output from said high frequency oscillator;
- a tool connected to said ultrasonic vibrator for machining a work;
- a work table for mounting the work thereon;
- load detection means for detecting load applied to said tool during machining and for outputting a load detection signal reflecting the load;
- load/amplitude converting means for converting the load detection signal into an amplitude conversion value appropriate for the load, and
- amplitude value generating means for receiving the amplitude conversion value, for generating the amplitude value based on the amplitude conversion value, and for outputting the amplitude value to said high frequency oscillator.

13. The ultrasonic machine according to claim 12, wherein said ultrasonic vibrator includes a piezoelectric transducer.

14. The ultrasonic machine according to claim 12, wherein said load detection means is disposed on said work table and mounts the work thereon.

15. The ultrasonic machine according to claim 12, wherein said amplitude value generating means includes inhibiting means for inhibiting outputting the amplitude value which is greater than a predetermine amplitude value.

16. The ultrasonic machine according to claim 12, wherein said load/amplitude converting means includes gain adjustment means for adjusting a gain value of said load/amplitude converting means, whereby a gain of conversion in said load/amplitude converting means can be adjusted in accordance with a type of the tool.

* * * * *